Feb. 14, 1933.    P. S. CARTER ET AL    1,897,237
METHOD AND MEANS FOR MEASURING ELECTRICAL ENERGY
Filed April 23, 1929

INVENTOR
P. S. CARTER
BY  J. L. FINCH
ATTORNEY

Patented Feb. 14, 1933

1,897,237

UNITED STATES PATENT OFFICE

PHILIP S. CARTER, OF STONY BROOK, AND JAMES L. FINCH, OF ROCKY POINT, NEW YORK, ASSIGNORS TO RADIO CORPORATION OF AMERICA, A CORPORATION OF DELAWARE

METHOD AND MEANS FOR MEASURING ELECTRICAL ENERGY

Application filed April 23, 1929. Serial No. 357,451.

This invention relates to the measurement of electrical energy, and more particularly to the measurement of antenna current during signalling.

It is sometimes necessary to read the value of current flowing in a circuit during times of flow, even though the flow is undergoing rapid interruptions. It is not entirely satisfactory to merely average the current because the response then is dependent upon the relative magnitude of the times of current flow and stoppage. Accordingly, it is an object of our invention to measure the current flowing during intervals of flow, despite rapid interruptions, which we do by utilizing the interrupted current to induce current in a rectifier circuit, charging a condenser with the rectified current, the condenser being provided with a leak of such magnitude relative to the capacitance of the condenser that no appreciable discharge of the condenser takes place during the rapid interruptions, and securing a measurement in response to the magnitude of the charge on the condenser, which in turn is dependent upon the magnitude of the original current flow. We prefer to use the condenser potential in connection with an electron discharge tube to govern the magnitude of the electron flow through the tube, and then to measure this flow with an ammeter. The electron discharge tube may be of the two element type, with the condenser potential applied directly to the cold electrode of the tube, or of the three element type, with the condenser potential applied to the control electrode of the tube.

In order to tune transmitter circuits it is customary to read the antenna current, and it has heretofore been necessary to interrupt the traffic being sent from the transmitter, giving the engineer complete control thereof until adjustment is made, so that he might work with a steady antenna current. These traffic interruptions are always undesirable, and sometimes frequent, and to obviate them is a more particular object of our invention. For this purpose we apply a measuring circuit as already described to the antenna circuit of the transmitter, so that the operator can read the antenna current even during signalling.

Figure 1:
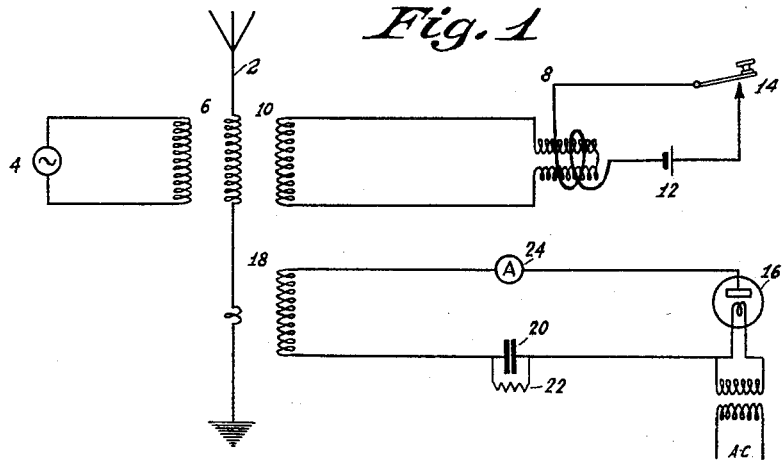
Figure 2:
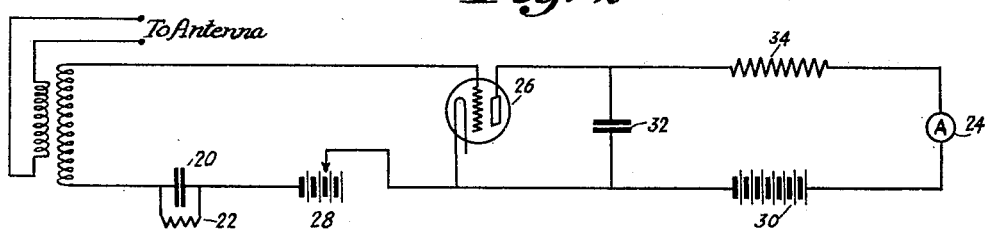
Figure 3:
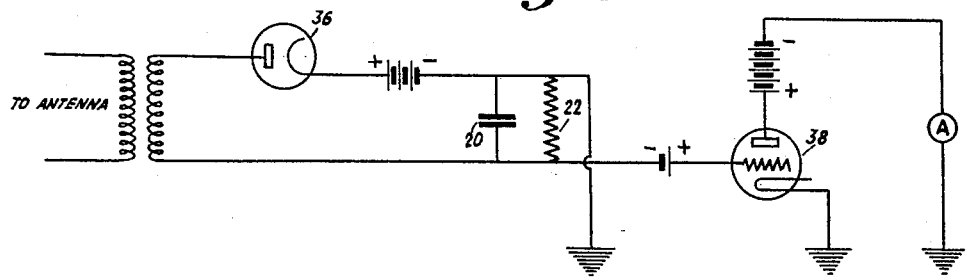

The invention is described more in detail in the following specification, which is accompanied by a drawing in which Figure 1 is a wiring diagram of one form of our invention, employing a two element tube;

Figure 2 is a modification of the measuring circuit in Figure 1, showing the use of a three element tube, and Figure 3 is still another modification of our invention.

Referring to Figure 1 there is an antenna circuit 2, energized by an alternator 4 through a transformer 6. The radiation is controlled in any suitable manner, exemplified in this case by a magnetic amplifier 8 coupled to the alternator output by a transformer 10. The saturation current of the magnetic amplifier is supplied from a direct current source 12, and interrupted for signalling by a key 14.

A rectifier, in the form of a two element electron discharge tube 16, is coupled to the antenna circuit by means of a transformer 18. In the rectifier circuit there is inserted a condenser 20 provided with a high resistance leak 22. In the particular case illustrated the capacitance is of the order of twenty microfarads and the resistance is of the order of 300,000 ohms. Other values may be employed, the requirement being that they be so related to one another that it takes an appreciable time for the condenser to lose its charge, relative to the time of interruption of the current flow for signalling. In the rectifier circuit there is provided an ammeter 24, the current flow through which may be used as a measure of the antenna current, inasmuch as the electron stream through the rectifier will depend upon the potential applied to the anode of the tube 16. The filament of the tube may be heated from an alternating current source, as indicated in the drawing.

A modified form of measuring circuit is shown in Figure 2, from which it will be seen that this circuit employs a three electrode tube 26, and that the potential of the condenser 20 is applied to the control electrode of this tube. A steady bias potential may be provided by a C battery 28. Suitable proportions for the condenser and leak in this circuit are two microfarads capacitance, and three megohms resistance, in which case the time constant will be approximately six seconds, that is, it will take that long for the condenser to discharge two-thirds of its charge.

The ammeter 24, in this case, is included in the anode circuit of the tube 26, which is energized from a suitable B battery 30, and which may be provided with a by pass condenser 32, in order to shunt the radio frequency component of the anode current. The grid circuit of the tube is unilaterally conductive and therefore rectifies the current induced in that circuit by the antenna current, and so serves to charge the condenser 20. The potential of the charge is not affected by the rapid interruptions caused by code signalling, and therefore a steady potential is applied to the grid of the tube 26, and the magnitude of the anode current flow through the ammeter 24 is proportional to this steady potential. Upon variation of the current in the antenna which is of a more permanent nature than the rapid signal interruptions the current induced in the grid circuit changes, and the potential on the control electrode varies, so varying the anode current of the tube, and therefore the response of the instrument 24. It is desirable to include a resistance 34 in series with the ammeter 24, for with a resistance of approximately the same magnitude as the anode to filament resistance of the tube, the magnitude of the change in plate current is approximately proportional to the change of antenna current. Of course, the actual calibration is preferably obtained by comparison with a standard meter.

In the modification shown in Figure 3, the indicating device A is not placed directly in circuit with the rectifier 36. On the other hand, it is placed in the output circuit of a second amplifier tube 38 connected, as shown, so that variations in potential across the circuit 20, 22, becomes effective in causing changes in the anode current of tube 38. This arrangement, it will be found, will be still less susceptible to the rapid interruptions in the energy supplied to the antenna.

We claim:

1. An arrangement for measuring the transmission current flowing in an antenna circuit during signalling, despite rapid interruption of the current for signalling, comprising a three electrode vacuum tube, having anode cathode and a control electrode, a control electrode circuit, means coupling the control electrode circuit of the tube to the antenna circuit, a condenser and a shunting leak resistance connected in series in the control electrode circuit, the leak resistance being of such magnitude relative to the capacitance of the condenser that no appreciable discharge takes place during signal pulsations, an anode circuit including a source of anode current, a high resistance approximately equal in value to the internal resistance of the tube, and a measuring instrument connected in series in the anode circuit of the tube.

2. The method of obtaining a measurement of the current flowing in a circuit during signalling, even though the current for signalling be interrupted at a rapid rate, which includes utilizing the signalling current to produce rectified current, using the rectified current to charge a condenser, discharging the condenser through a shunting resistance so slowly that no appreciable discharge takes place during the signal variations and utilizing the charge on the condenser to determine the conductivity of a vacuum tube to vary the steady current flowing therethrough, and measuring the steady current as an indication of the signalling current.

3. An arrangement for measuring the current flowing in a circuit during signalling, even though the signalling current be interrupted at a rapid rate, comprising a three electrode thermionic tube having anode cathode and a control electrode, a circuit connected between said control electrode and said cathode, means for coupling said last named circuit to said first named circuit, a condenser and a shunting leak resistance connected in series in the control electrode circuit, the leak being of such magnitude relative to the capacity of the condenser that no appreciable discharge takes place during signal pulsations, an output circuit including a source of direct current connected between the anode and cathode of said thermionic tube, and current intensity measuring means connected with said output circuit.

PHILIP S. CARTER.
JAMES L. FINCH.